(12) United States Patent
Lin (10) Patent No.: US 9,669,469 B2
(45) Date of Patent: Jun. 6, 2017

(54) COUPLING DEVICE OF JIG (71) Applicant: CHERNG JIN TECHNOLOGY CO., LTD., Changhua County (TW)

(72) Inventor: Chien-Chih Lin, Changhua County (TW)

(73) Assignee: CHERNG JIN TECHNOLOGY CO., LTD., Changhua County (TW)

( * ) Notice: Subject to any disclaimer, the term of this patent is extended or adjusted under 35 U.S.C. 154(b) by 246 days.

(21) Appl. No.: 14/262,522

(22) Filed: Apr. 25, 2014

(65) Prior Publication Data

US 2015/0306677 A1    Oct. 29, 2015

(51) Int. Cl.
*B23B 31/107* (2006.01)
*B23Q 1/00* (2006.01)
*B23B 31/30* (2006.01)
*B23B 31/22* (2006.01)

(52) U.S. Cl.
CPC ........ *B23B 31/1071* (2013.01); *B23Q 1/0072* (2013.01); *B23B 31/107* (2013.01); *B23B 31/22* (2013.01); *B23B 31/30* (2013.01); *Y10T 279/1291* (2015.01); *Y10T 279/17743* (2015.01); *Y10T 279/17752* (2015.01); *Y10T 279/17811* (2015.01)

(58) Field of Classification Search
CPC ... B23B 31/1071; B23B 31/107; B23B 31/22; B23B 31/30; Y10T 279/17752; Y10T 279/17743; Y10T 279/17811; Y10T 279/1291
See application file for complete search history.

(56) References Cited

U.S. PATENT DOCUMENTS

| 4,900,202 A | * | 2/1990 | Wienhold | ........... B23B 31/1071 279/22 |
| 5,211,501 A | * | 5/1993 | Nakamura | ................ B25J 15/04 403/322.3 |
| 5,918,870 A | * | 7/1999 | Stark | .................... B23B 31/1071 269/309 |
| 5,967,528 A | * | 10/1999 | Ishii | ........................ B23B 31/30 279/2.05 |
| 6,302,408 B1 | * | 10/2001 | Zierpka | ................. B23B 31/005 279/14 |

(Continued)

FOREIGN PATENT DOCUMENTS

IT    WO 2014009201 A1 *  1/2014  ........... B23Q 1/0072

*Primary Examiner* — Eric A Gates
*Assistant Examiner* — Chwen-wei Su
(74) *Attorney, Agent, or Firm* — Ming Chow; Sinorica, LLC (57) ABSTRACT

A coupling device of jigs includes a foundation, a tube, a plurality of balls, and a piston base. The foundation has a chamber, in which a part of the tube is inserted. The tube has a plurality of through holes for housing the balls. The piston base is received in the chamber, and fitted to the tube. An inner surface of the piston base has a circular groove and an abutment surface. The piston base can be moved along an axial direction of the tube between a first position and a second position. When at the first position, a part of each ball is inside the circular groove; when at the second position, an area where the abutment surface abuts against each ball is not merely a single point. Whereby, the force applied on the abutment surface is dispersed, and therefore the processing accuracy of workpieces is ensured.

9 Claims, 9 Drawing Sheets

(56) References Cited

U.S. PATENT DOCUMENTS

| | | | | |
|---|---|---|---|---|
| 9,151,343 B2 * | 10/2015 | Norton | ............... | F16D 41/086 |
| 2003/0189279 A1 * | 10/2003 | Yonezawa | ............... | B25B 5/062 |
| | | | | 269/24 |
| 2010/0113236 A1 * | 5/2010 | Norton | ............... | B23B 31/22 |
| | | | | 483/1 |
| 2010/0219574 A1 * | 9/2010 | Stark | ............... | B23Q 1/0072 |
| | | | | 269/309 |

* cited by examiner

COUPLING DEVICE OF JIG

BACKGROUND OF THE INVENTION

1. Technical Field

The present invention relates generally to jigs, and more particularly to a coupling device of a jig.

2. Description of Related Art

Jigs are used to repeatedly and accurately produce great amount of products, and there are various types of jigs compatible for different processing methods and different usages. For example, a jig applied for electrical discharge machining (EDM) is usually placed in an EDM machine which is connected to a power source. A metal workpiece is engaged to a coupling device, and the coupling device is coupled with a jig to process the workpiece. Therefore, the coupling device can be conveniently decoupled from the jig with the workpiece still engaged thereto.

Figure 1:
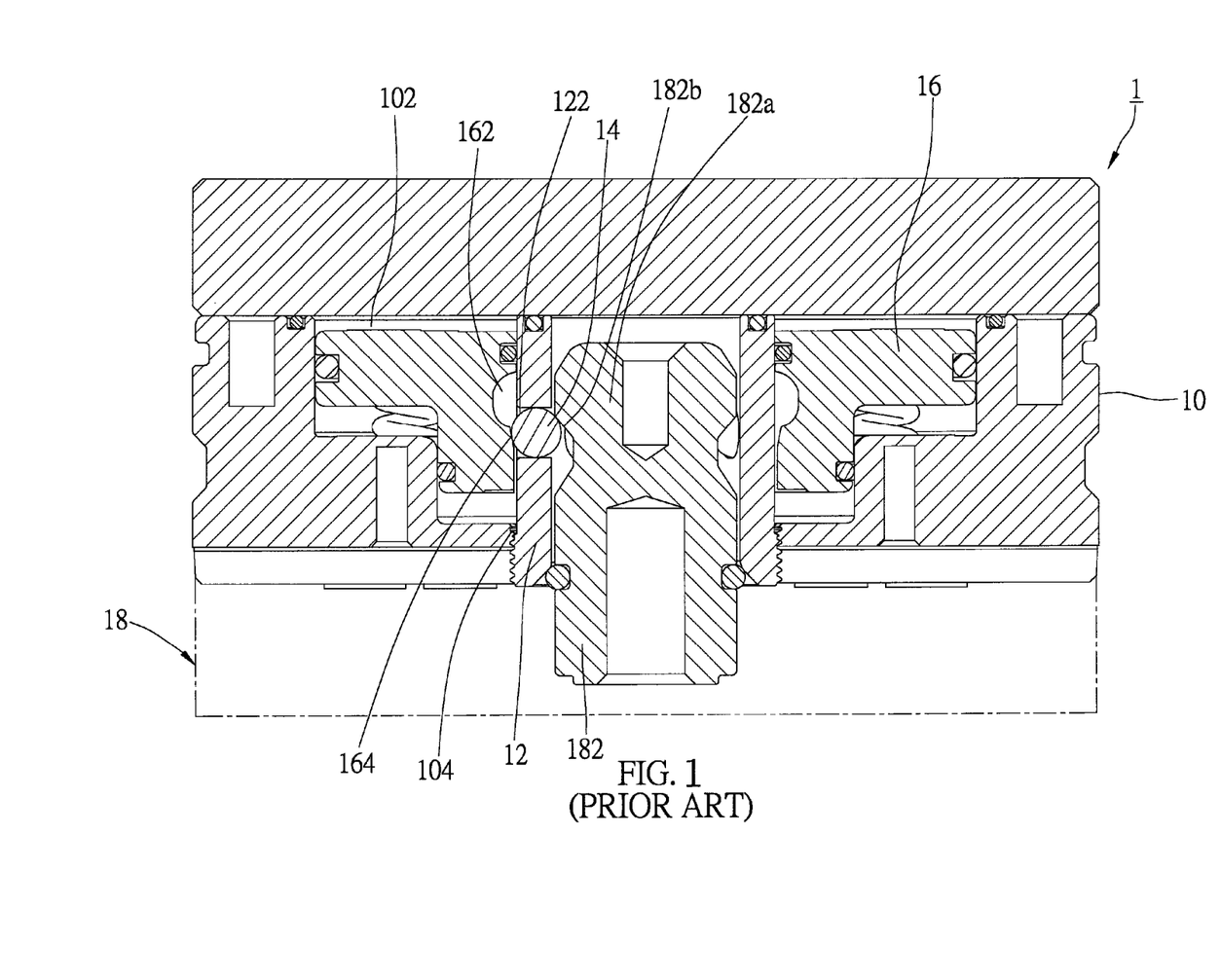
FIG. 1 is a sectional view of the conventional coupling device.

As shown in FIG. 1, a conventional coupling device 1 includes a foundation 10, a tube 12, a plurality of balls 14, and a piston base 16. Metal workpieces are placed on the foundation 10, wherein the foundation 10 has a chamber 102 within and a perforation 104 which communicates the chamber 102 and an exterior of the foundation 10. The tube 12 is engaged to the foundation 10, and is inserted in the perforation 104. The tube 12 has a plurality of through holes 122 for housing the balls 14. The piston base 16 is provided in the chamber 102, and movably fitted to the tube 12. The piston base 16 has an inner surface facing an outer surface of the tube, wherein the inner surface has a circular groove 162 and a smooth inclined section 164. Whereby, when the piston base 16 is moved to let the circular groove 162 correspond to the balls 14, a plug 182 of a jig 18 is able to be moved in or out the tube 12 smoothly. While the plug 182 is moved into the tube 12, a head 182a of the plug 182 pushes the balls 14 aside. After that, the piston base 16 is moved to let the inclined section 164 abut against the balls 14, and therefore the balls 14 restrict the neck 182b of the plug 182 to couple the coupling device 1 to the jig 18.

Figure 2:
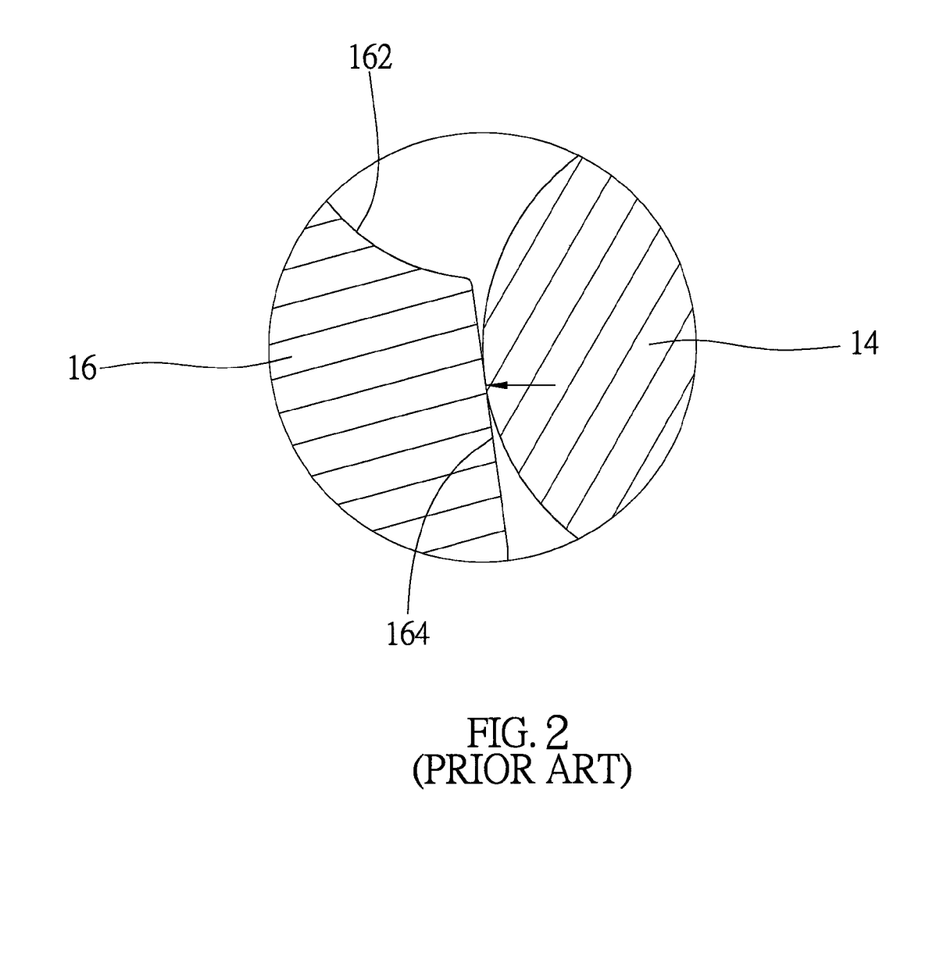
FIG. 2 is a partial enlarged view of FIG. 1.

As shown in FIG. 2, the inclined section 164 abuts against each ball 14 with a single point. When the coupling device 1 is applied with a shear force, these single points are the only bearers for the force. As a result, the surface of the inclined section 164 tends to dent, which leads to slight mismatch between the coupling device 1 and the jig 18, and thus affects the processing accuracy of the workpieces.

BRIEF SUMMARY OF THE INVENTION

In view of the above, the primary objective of the present invention is to provide a coupling device, which ensures the processing accuracy of workpieces.

The coupling device of the present invention includes a foundation, a tube, a plurality of balls, and a piston base. The foundation has a chamber therein and a perforation on a surface thereof and connecting to the chamber; the tube is engaged with the perforation of the foundation, wherein the tube has a plurality of through holes; the balls are respectively movably provided in each of the through holes of the tube; the piston base is received in the chamber and fitted to an outer surface of the tube, wherein the piston base can be moved along an axial direction of the tube between a first position and a second position; the piston base has an inner surface facing the outer surface of the tube, and a circular groove is formed on the inner surface of the piston base; when the piston base is at the first position, a part of each of the balls is received in the circular groove; the inner surface of the piston base further includes a abutment surface, which abuts against each ball with an area when the piston base is at the second position Since the area where the abutment surface of the piston base abuts against each ball is not merely a single point, the force applied on the abutment surface can be dispersed to prevent the abutment surface from being damaged, and therefore the processing accuracy of workpieces under processing can be ensured.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As shown in FIG. 3 to FIG. 7, a coupling device 2 of the first preferred embodiment of the present invention includes a foundation 20, a tube 26, a plurality of balls 28, and a piston base 30. The coupling device 2 is coupled to a jig 3, which includes a plug 46, and the plug 46 has a head 462 and a neck 464.

Figure 3:
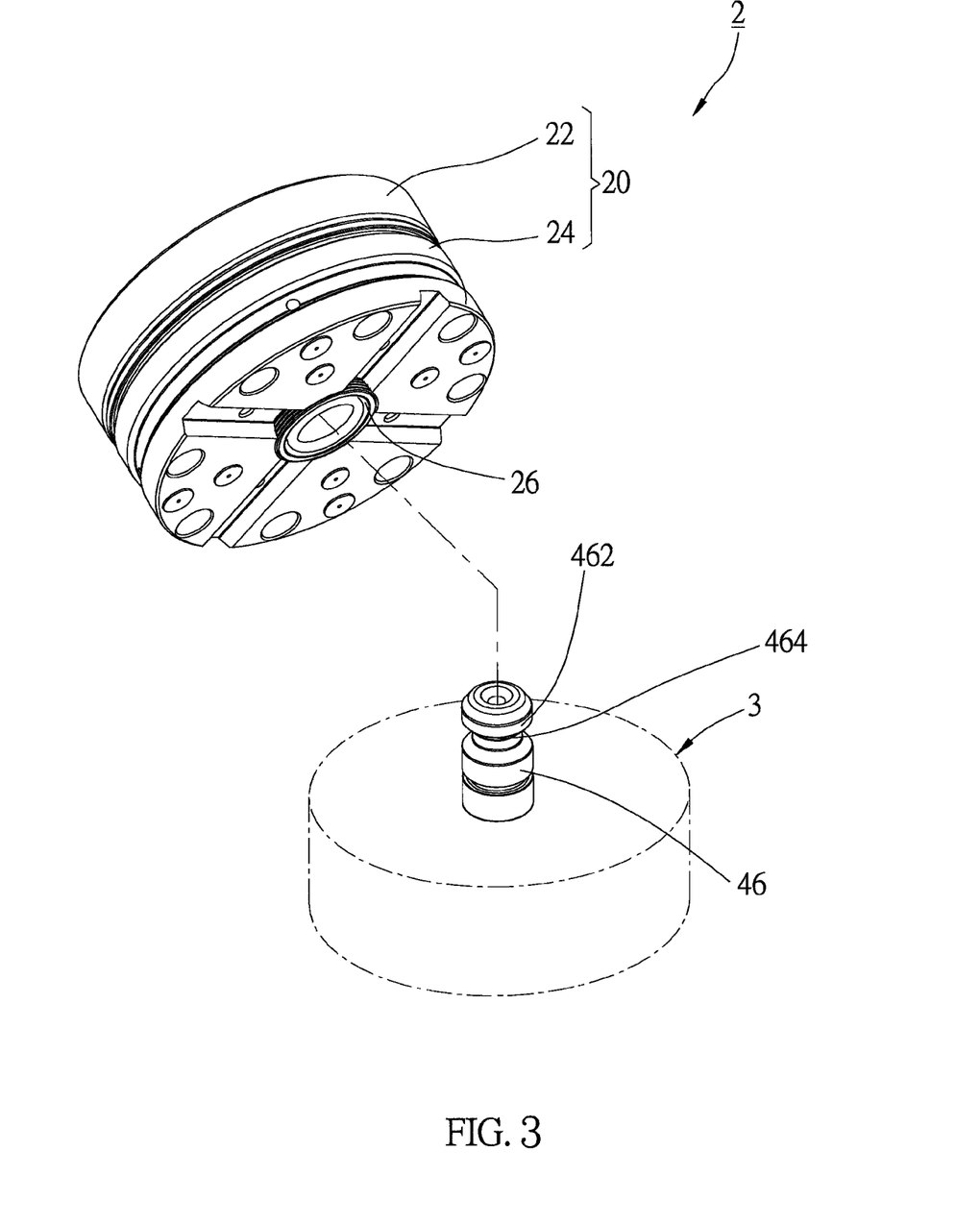
FIG. 3 is a perspective view of a first preferred embodiment of the present invention.
Figure 4:
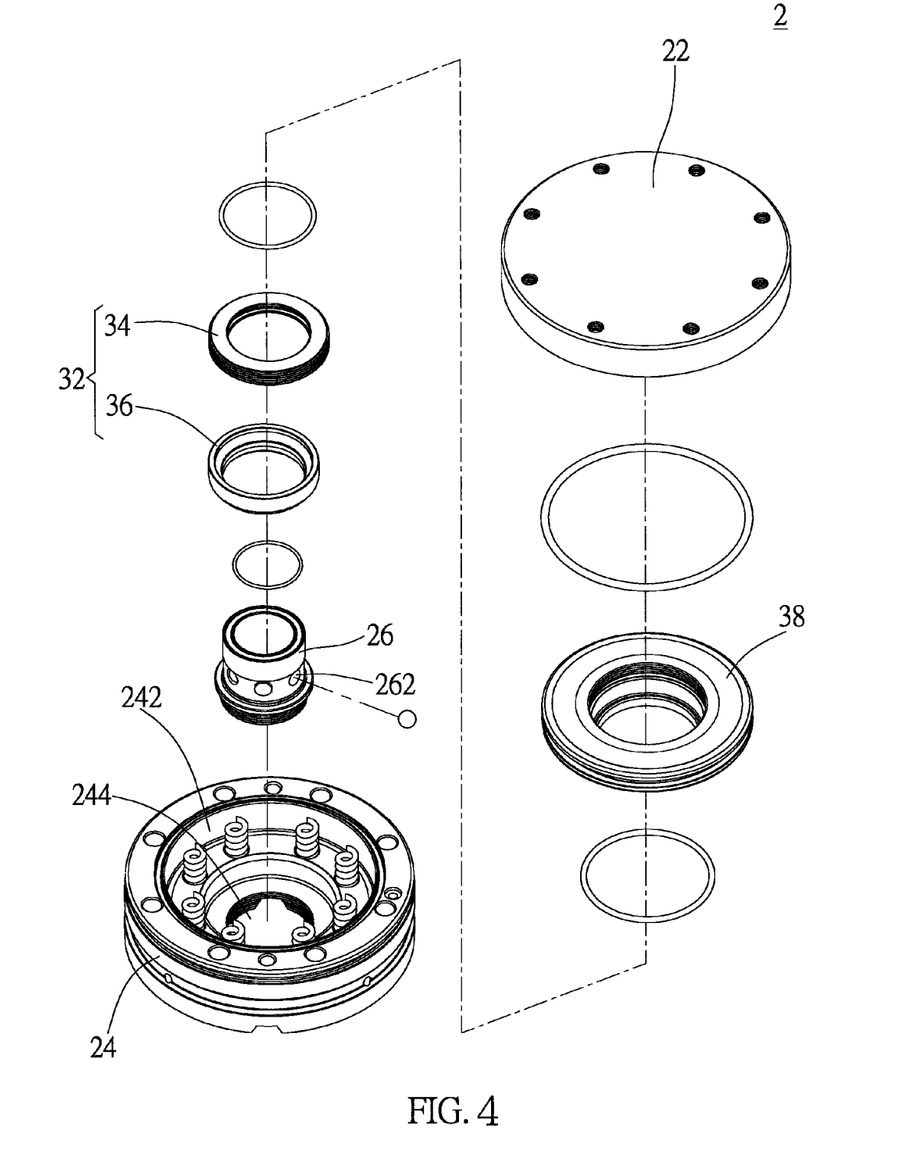
FIG. 4 is a exploded view of the first preferred embodiment of the present invention.

The foundation 20 has a top seat 22 and a bottom seat 24 connected to the top seat 22, wherein the top seat 22 is used for placing workpieces (not shown), and the bottom seat 24 touches a surface of the jig 3. The bottom seat 24 has a chamber 242 and a perforation 244 which connects the chamber 242 to an exterior of the foundation 20.

Figure 5:
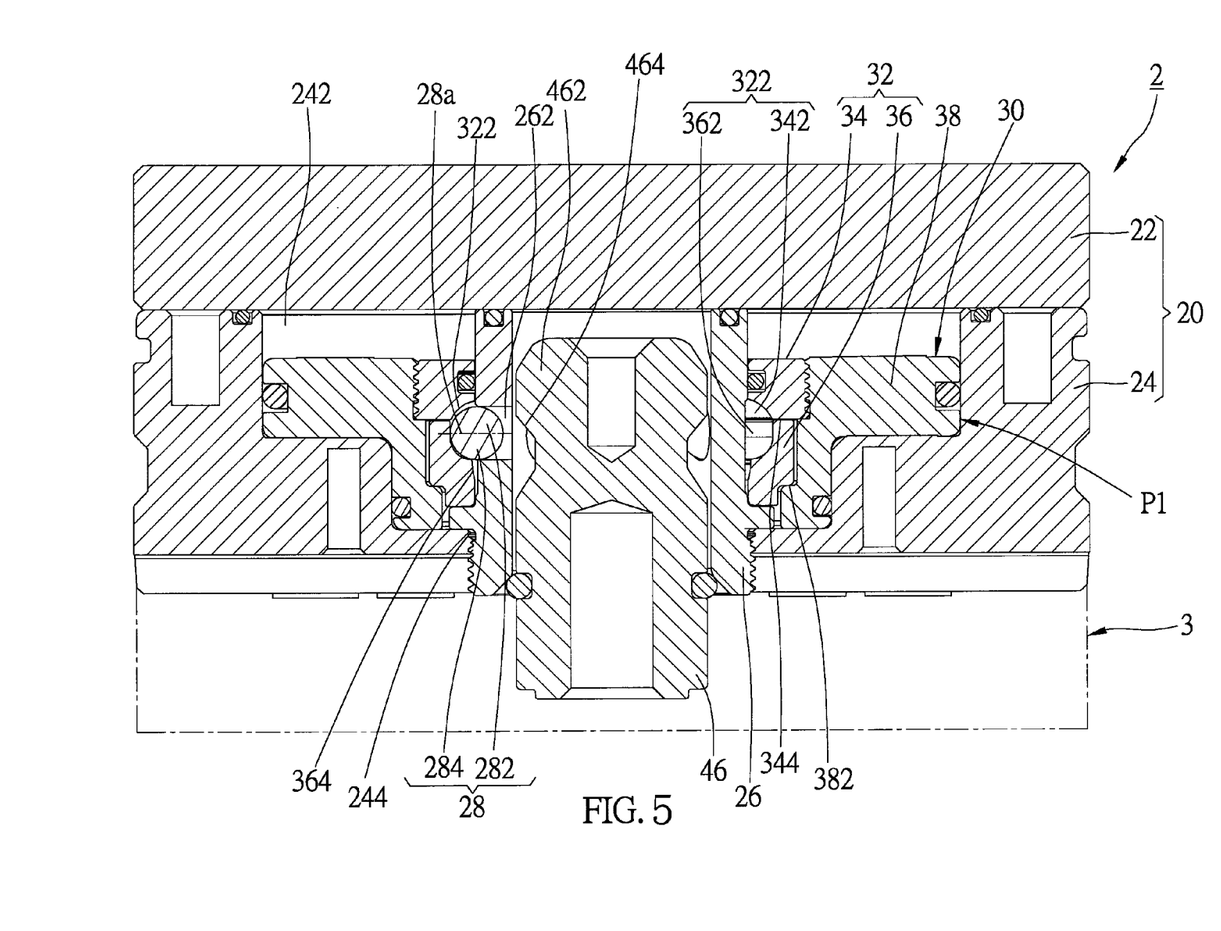
FIG. 5 is a sectional view of the first preferred embodiment of the present invention, showing the piston seat at the first position.

An end of the tube 26 is inserted into the perforation 244 of the bottom seat 24 to enter the chamber 242. More specifically, a part of the tube 26 is inside the chamber 242, and the rest is inside the perforation 244. The tube 26 has an outer screw thread adjacent to a distal end thereof, and the perforation 244 has a corresponding inner screw thread, so they can be meshed to secure the tube 26 in the foundation 20. The tube 26 is provided with a plurality of through holes 262 along radial directions thereof, and each through hole 262 goes through a wall of the tube 26.

The balls 28 are respectively placed inside each through hole 262 of the tube 26. Each ball 28 is defined to have a reference plane 28a which passes a sphere center of the ball 28, and is vertical to an axial direction of the tube 26. Each ball 28 is divided into a first hemisphere 282 and a second hemisphere 284 by the reference plane 28a.

The piston base 30 is received inside the chamber 242, wherein the piston base 30 includes a loop seat 32 and a main body 38. The loop seat 32 includes a pressing ring 34 and an abutment ring 36, wherein the pressing ring 34 and the abutment ring 36 are movably fitted to the tube 26, and inner surfaces of the pressing ring 34 and the abutment ring 36 face an outer surface of the tube 26. The main body 38 is engaged to an outer surface of the pressing ring 34. An outer surface of the main body 38 abuts against a wall of the chamber 242 of the foundation 20, and the main body 38 can be moved upwardly or downwardly along the wall of the chamber 242. The pressing ring 34 has a first stop surface 344, and the main body 38 has a second stop surface 382, wherein the abutment ring 36 is held by the first stop surface 344 and the second stop surface 382. Whereby, the chamber 242 is divided into two sub-chambers by the piston base 30, and the piston base 30 can be driven to move back and forth along the axial direction of the tube 26 by changing a pressure difference between the two sub-chambers. How the piston base 30 is driven is not described in detail herein because it is not the focus of the present invention.

Figure 7:
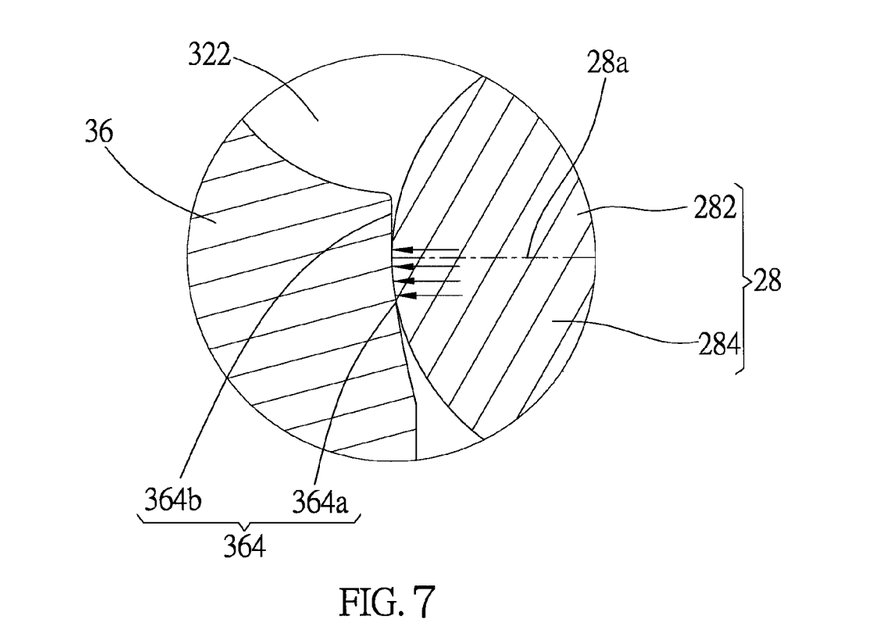
FIG. 7 is a partial enlarged view of FIG. 6.

In addition, the inner surfaces of the pressing ring 34 and the abutment ring 36 are respectively recessed to form two communicating slots 342, 362. The inner surfaces of the pressing ring 34 and the abutment ring 36 together form an inner surface of the loop seat 32, and the two slots 342, 362 together form a circular groove 322 of the loop seat 32. Furthermore, the inner surface of the abutment ring 36 further includes an abutment surface 364 adjacent to the circular groove 322. In the preferred embodiment, the abutment surface 364 includes a recession section 364a and a flat section 364b, wherein the recession section 364a has a concave surface, and a radius of curvature of the recession section 364a is substantially no less than a radius of each ball 28. The flat section 364b is between the circular groove 322 and the recession section 364a, and is adjacent to the circular groove 322 and the recession section 364a. The flat section 364b has a flat surface which is parallel to the axial direction of the tube 26.

Figure 6:
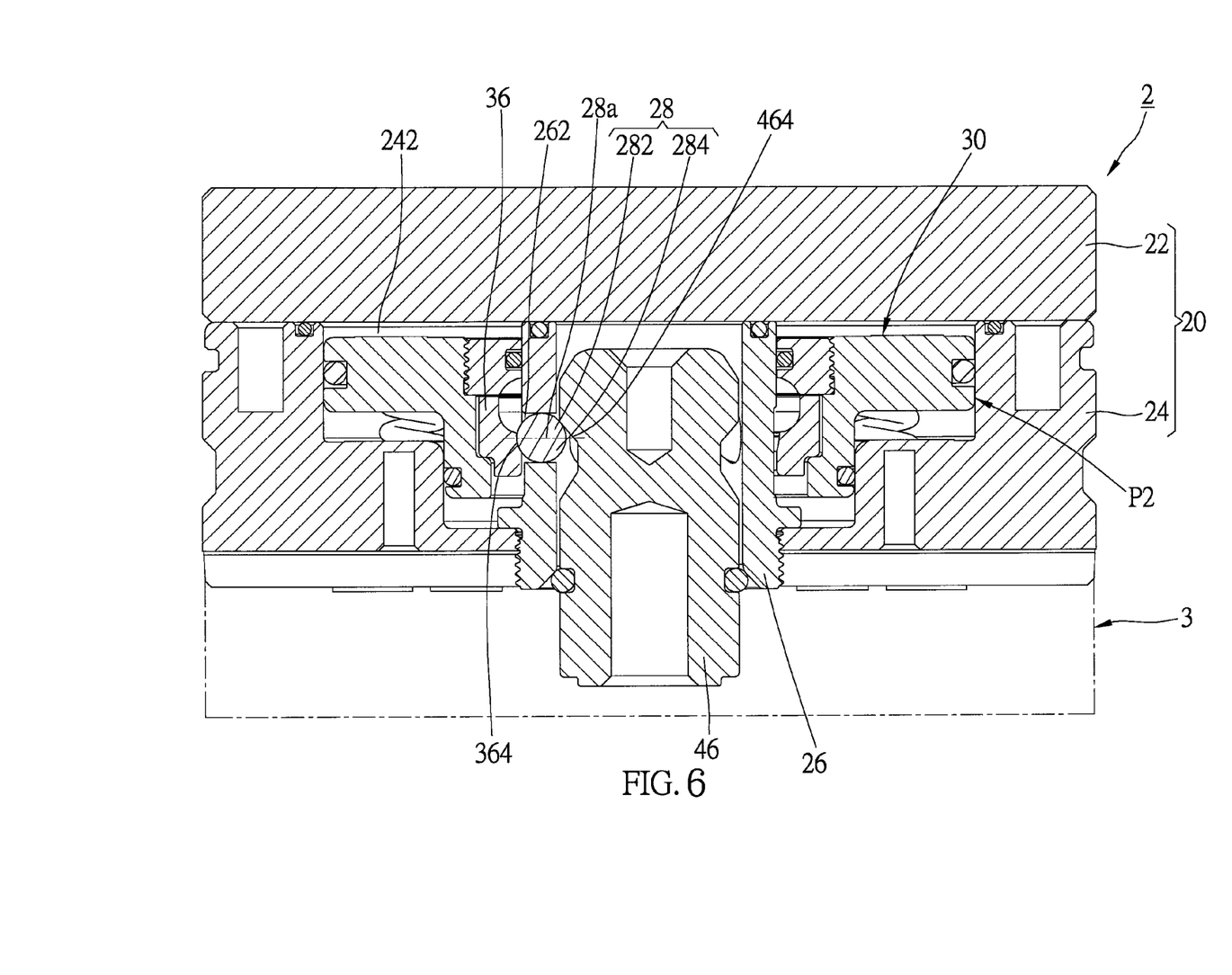
FIG. 6 is a sectional view of the first preferred embodiment of the present invention, showing the piston seat at the second position.

With the aforementioned design, the piston base 30 is driven to move between a first position P1 shown in FIG. 5 and a second position P2 shown in FIG. 6. When the piston base 30 is at the first position P1, the balls 28 are movable. After the plug 46 is inserted into the tube 26, the head 462 of the plug 46 abuts against the balls 28 to receive a part of each ball 28 in the circular groove 322, as shown in FIG. 5. When the piston base 30 is moved to the second position P2, each ball 28 is pushed by the abutment ring 36 to exceed the inner surface of the tube 26 and abut against the neck 464 of the plug 46. The recession section 364a of the abutment surface 364 abuts against the second hemisphere 284 of each ball 28, and the flat section 364b corresponds to the first hemisphere 282 of each ball 28, as shown in FIG. 7 and FIG. 8.

Please refer to FIG. 7, the recession section 364a touches each ball 28 with an area instead of a single point, for the radius of curvature of the recession section 364a is no less than the radius of each ball 28, and therefore the plug 46 is held firmly. While processing the workpieces, if the foundation 20 is applied with a shear force, the force on the abutment surface 364 is dispersed to each touching point between the recession section 364a and each ball 28, which prevents the abutment surface 364 from being damaged as the conventional situation.

Figure 8:
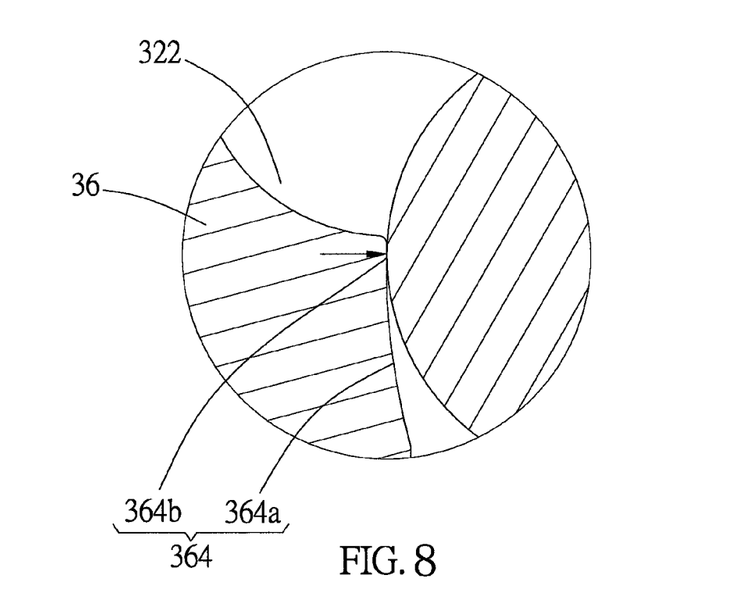
FIG. 8 is a schematic diagram of the first preferred embodiment of the present invention, showing how the balls abutting against the flat section of the abutment surface.

It is worth mentioning that if the shear force applied on the foundation 20 is large enough to move the coupling device 2 laterally, and the balls 28 are moved by the plug 46, the flat section 364b of the abutment surface 364 abuts against the balls 28, as shown in FIG. 8. Meanwhile, the flat section 364b provides a reaction force to counteract the shear force from the plug 46. In this way, a shift of the coupling device 2 is restricted, and the processing accuracy of the workpieces is ensured.

Figure 9:
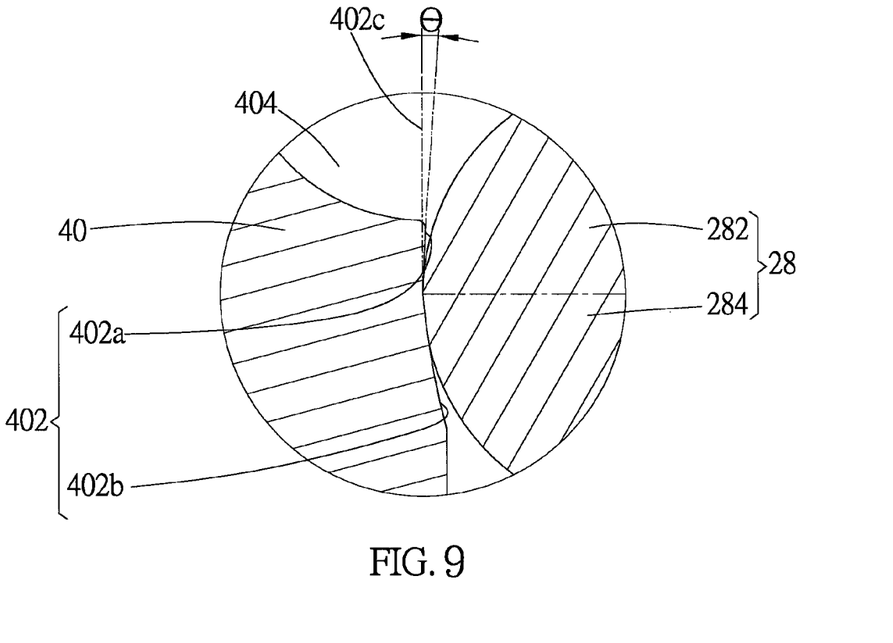
FIG. 9 is a partial enlarged view of a second preferred embodiment of the present invention.

As shown in FIG. 9, the coupling device of the second preferred embodiment of the present invention has basically the same structure as the first preferred embodiment, except that the abutment surface 402 of the abutment ring 40 includes an inclined section 402a between the circular groove 404 and the recession section 402b, and the inclined section 402a is adjacent to the circular groove 404 and the recession section 402b. The inclined section 402a inclines towards the tube 26 from the recession section 402b to the circular groove 404. The recession section 402b is defined to have a tangent 402c parallel to the axial direction of the tube 26. When the piston base 16 is at the second position P2, the inclined section 402a corresponds to the first hemisphere 282 of each ball 28, and the recession section 402b corresponds to the second hemisphere 284 of each ball 28. Preferably, an included angle θ between the inclined section 402a and the tangent 402c is no larger than 3 degrees to let the abutment ring 40 can be moved smoothly along a surface of each ball 28.

Figure 10:
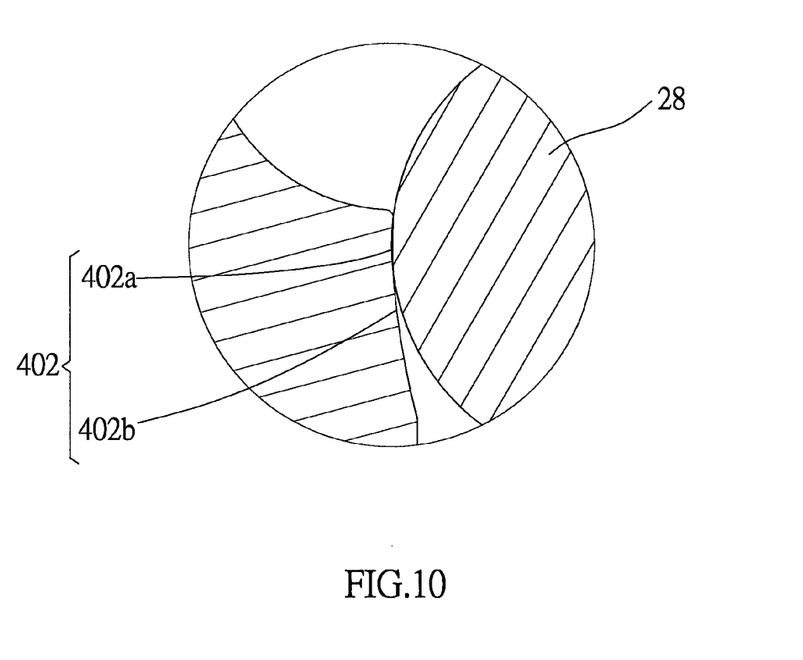
FIG. 10 is a schematic diagram of the second preferred embodiment of the present invention, showing how the balls abutting against the inclined section of the abutment surface.

Similarly, the recession section 402b touches each ball 28 with an area instead of a single point, and the effect is the same as the first preferred embodiment. Furthermore, if a shear force applied on the foundation 20 is large enough to move the coupling device, and the balls 28 are moved by the plug 46, the inclined section 402a of the abutment surface 402 abuts against the surface of each ball 28, as shown in FIG. 10. The inclined section 402a and the recession section 402b further together restrict shifts of the balls 28 to hold the balls 28 even more firmly. Whereby, the foundation 20 of the second preferred embodiment is capable of bearing larger shear force than the first preferred embodiment.

Figure 11:
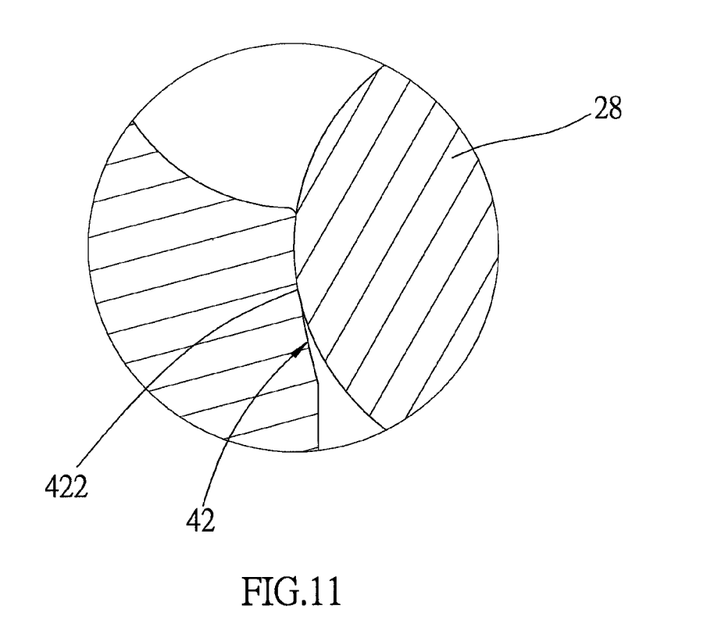
FIG. 11 is a schematic diagram of the abutment surface of a third embodiment of the present invention.
Figure 12:
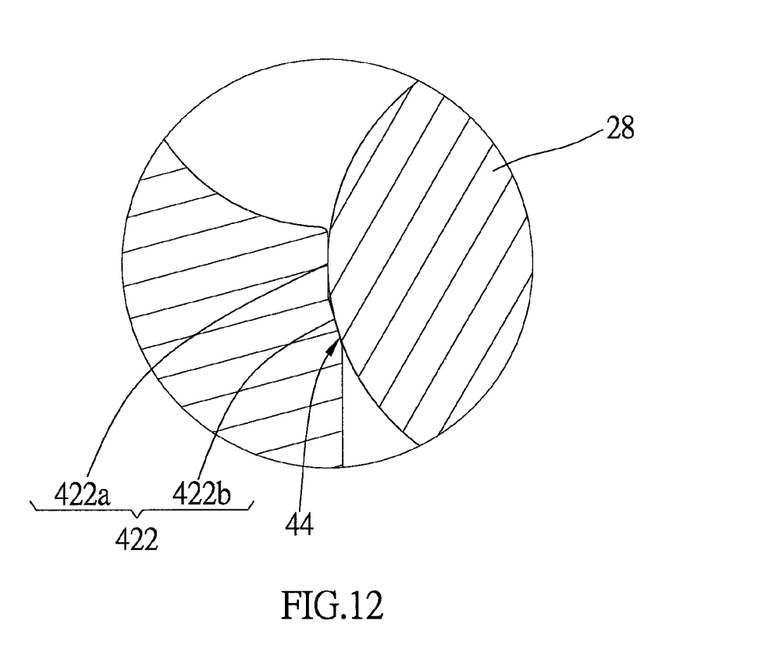
FIG. 12 is a schematic diagram of the abutment surface of a fourth embodiment of the present invention.

As shown in FIG. 11, the abutment surface 42 of the third preferred embodiment of the present invention merely includes a recession section 422, and the recession section 422 has a concave surface too, which also touches each ball 28 with an area. Furthermore, as shown in FIG. 12, the recession section 442 of the abutment surface 44 of the fourth preferred embodiment of the present invention is formed by two inclined sections 442a, wherein the two inclined sections 442a abut against each ball 28 with an area larger than those of any aforementioned embodiments. In practice, the recession section 442 could include more than two inclined sections 442a.

In summary, the inner surface of the piston base of the present invention is provided with the abutment surface to touch each ball with an area instead of one single point, which effectively disperse the force applied on the abutment surface to prevent the abutment surface of the piston base being damaged, and therefore the processing accuracy of workpieces can be ensured. It is worth mentioning that the abutment surface provided with the flat section or the inclined section helps the coupling device to bear even larger shear force, and the coupling device is restricted to be moved greatly.

It must be pointed out that the embodiments described above are only some preferred embodiments of the present invention. All equivalent structures which employ the concepts disclosed in this specification and the appended claims should fall within the scope of the present invention.

What is claimed is:

1. A coupling device comprising:
    a foundation comprising a chamber therein and a perforation on a surface thereof and connecting to the chamber;
    a tube engaged with the perforation of the foundation, the tube comprising a plurality of through holes;
    a plurality of balls respectively movably provided in each of the through holes of the tube;
    a piston base received in the chamber and fitted to an outer surface of the tube, the piston base being capable of being moved along an axial direction of the tube between a first position and a second position, the piston base comprising an inner surface facing the outer surface of the tube and a circular groove being formed on the inner surface of the piston base, a part of each of the balls being received in the circular groove in response to the piston base being at the first position, the inner surface of the piston base further comprising a abutment surface abutting against each ball with an area in response to the piston base being at the second position;
    the piston base comprising a main body and a loop seat fitted on the outer surface of the tube;
    the abutment surface and the circular groove being provided on the loop seat;
    the main body being engaged to an outer surface of the loop seat;
    an outer surface of the main body abutting against walls of the chamber of the foundation;
    the loop seat comprising a pressing ring and an abutment ring;
    the main body being engaged to an outer surface of the pressing ring;
    the pressing ring comprising a first stop surface;
    the main body comprising a second stop surface;
    the abutment ring being held between the first stop surface and the second stop surface; and
    the abutment surface and at least a part of the circular groove being provided on the abutment ring.

2. The coupling device of claim 1, wherein the abutment surface of the piston base includes a recession section; when the piston base is at the second position, the recession section of the abutment surface abuts against each ball.

3. The coupling device of claim 2, wherein the recession section has a concave surface, and a radius of curvature of the concave surface is substantially no less than a radius of the balls.

4. The coupling device of claim 2, wherein the abutment surface of the piston base includes a flat section between the circular groove and the recession section; the flat section connects the circular groove and the recession section, and is parallel to the axial direction of the tube.

5. The coupling device of claim 4, wherein each ball is defined to have a reference plane which passes a sphere center of the ball, and is vertical to the axial direction of the tube; each ball is divided into a first hemisphere and a second hemisphere by the reference plane; when the piston base is at the second position, the flat section corresponds to the first hemispheres, and the recession section corresponds to the second hemispheres.

6. The coupling device of claim 2, wherein the abutment surface includes an inclined section between the circular groove and the recession section; the inclined section connects the circular groove and the recession section, and is inclined toward the circular groove from the recession section.

7. The coupling device of claim 6, wherein the recession section has a concave surface, and is defined to have a tangent parallel to the axial direction of the tube; an included angle between the inclined section and the tangent is no larger than 3 degrees.

8. The coupling device of claim 6, wherein each ball is defined to have a reference plane which passes a sphere center of the ball, and is vertical to the axial direction of the tube; each ball is divided into a first hemisphere and a second hemisphere by the reference plane; when the piston base is at the second position, the inclined section corresponds to the first hemispheres, and the recession section corresponds to the second hemispheres.

9. The coupling device of claim 2, wherein the recession section includes two inclined sections abut against the balls.

* * * * *